(12) United States Patent
Ray et al.

(10) Patent No.: US 8,718,595 B2
(45) Date of Patent: *May 6, 2014

(54) EMERGENCY DATA MESSAGE ROUTER DATABASE

(75) Inventors: Amar Nath Ray, Shawnee, KS (US); Carl M. Coppage, Kansas City, MO (US); Lynn T. Greene, Olathe, KS (US); Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,507

(22) Filed: Apr. 30, 2012

(65) Prior Publication Data

US 2012/0214437 A1 Aug. 23, 2012

Related U.S. Application Data

(63) Continuation of application No. 12/257,641, filed on Oct. 24, 2008.

(60) Provisional application No. 61/078,123, filed on Jul. 3, 2008.

(51) Int. Cl.
  *H04M 11/04* (2006.01)
  *H04M 3/42* (2006.01)
  *H04L 12/28* (2006.01)

(52) U.S. Cl.
  USPC .................. 455/404.1; 455/414.1; 370/351

(58) Field of Classification Search
  USPC ..................................................... 455/404.1
  See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |

(Continued)

OTHER PUBLICATIONS

Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.

(Continued)

*Primary Examiner* — Lester Kincaid
*Assistant Examiner* — Andy Gu
(74) *Attorney, Agent, or Firm* — Swanson & Bratschun, L.L.C.

(57) ABSTRACT

A system and method for providing information associated with public safety answering points may include storing a set of records including information associated with a plurality of PSAPs, each record may include (i) an identifier indicative of a PSAP available to service emergency communications, (ii) at least one cell code identifier indicative of cell sites in which the associated PSAP services, and (iii) at least one network address capable of receiving certain emergency data message types. In response to receiving a request, a PSAP local to a wireless communications device of a user who sent an emergency data message may be identified, and a network address associated with the identified local PSAP may be provided.

20 Claims, 4 Drawing Sheets

(56) References Cited

U.S. PATENT DOCUMENTS

| | | |
|---|---|---|
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsey et al. |
| 6,591,112 B1 | 7/2003 | Siccardo et al. |
| 6,642,844 B2 | 11/2003 | Montague |
| 6,678,357 B2 | 1/2004 | Stumer et al. |
| 6,690,932 B1 | 2/2004 | Barnier et al. |
| 6,771,163 B2 | 8/2004 | Linnett et al. |
| 6,839,022 B1 | 1/2005 | Benco et al. |
| 7,026,925 B2 | 4/2006 | Roche et al. |
| 7,079,627 B2 | 7/2006 | Crago et al. |
| 7,095,733 B1 | 8/2006 | Yarlagadda et al. |
| 7,098,787 B2 | 8/2006 | Miller |
| 7,231,218 B2 | 6/2007 | Diacakis et al. |
| 7,269,413 B2 | 9/2007 | Kraft |
| 7,386,103 B1 | 6/2008 | Chahal |
| 7,418,087 B2 | 8/2008 | Luneau et al. |
| 7,496,189 B2 | 2/2009 | Clarisse et al. |
| 7,679,505 B1 | 3/2010 | Vallaire |
| 7,706,356 B1 | 4/2010 | Olshansky et al. |
| 7,734,019 B1 | 6/2010 | Terpstra |
| 7,773,975 B2 | 8/2010 | Snapp et al. |
| 7,920,679 B1 | 4/2011 | Naim et al. |
| 8,014,341 B1 | 9/2011 | Ray |
| 8,102,986 B1 | 1/2012 | McClintock et al. |
| 8,295,801 B2 | 10/2012 | Ray et al. |
| 8,320,871 B2 | 11/2012 | Ray et al. |
| 8,364,113 B2 | 1/2013 | Ray et al. |
| 8,447,267 B2 | 5/2013 | Ray et al. |
| 8,630,609 B2 | 1/2014 | Ray et al. |
| 2001/0003843 A1 | 6/2001 | Scepanovic et al. |
| 2001/0004588 A1 | 6/2001 | Hong |
| 2001/0012379 A1 | 8/2001 | Amemiya et al. |
| 2002/0016189 A1 | 2/2002 | Sheynblat et al. |
| 2002/0054667 A1* | 5/2002 | Martinez ............ 379/45 |
| 2002/0136363 A1 | 9/2002 | Stumer et al. |
| 2003/0012344 A1 | 1/2003 | Agarwal et al. |
| 2003/0063714 A1 | 4/2003 | Stumer et al. |
| 2003/0109245 A1 | 6/2003 | McCalmont et al. |
| 2003/0133450 A1 | 7/2003 | Baum |
| 2003/0158668 A1 | 8/2003 | Anderson |
| 2004/0072583 A1 | 4/2004 | Weng |
| 2004/0090950 A1 | 5/2004 | Lauber et al. |
| 2004/0176123 A1 | 9/2004 | Chin et al. |
| 2004/0257273 A1 | 12/2004 | Benco et al. |
| 2005/0002499 A1 | 1/2005 | Ordille et al. |
| 2005/0003797 A1 | 1/2005 | Baldwin |
| 2005/0070315 A1 | 3/2005 | Rai et al. |
| 2005/0101287 A1 | 5/2005 | Jin et al. |
| 2005/0111630 A1 | 5/2005 | Potorny et al. |
| 2005/0123102 A1* | 6/2005 | Beason et al. ............ 379/45 |
| 2005/0151642 A1 | 7/2005 | Tupler et al. |
| 2005/0159132 A1 | 7/2005 | Wright et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0232225 A1* | 10/2005 | Pelaez et al. ............ 370/351 |
| 2005/0265326 A1 | 12/2005 | Laliberte |
| 2006/0009190 A1 | 1/2006 | Laliberte |
| 2006/0043164 A1 | 3/2006 | Dowling et al. |
| 2006/0052134 A1 | 3/2006 | Sato |
| 2006/0072547 A1* | 4/2006 | Florkey et al. ............ 370/352 |
| 2006/0133582 A1 | 6/2006 | McCulloch |
| 2006/0217136 A1 | 9/2006 | Bantukul et al. |
| 2006/0219542 A1 | 10/2006 | Savir |
| 2006/0234726 A1 | 10/2006 | Ashley et al. |
| 2006/0234727 A1 | 10/2006 | Ashley et al. |
| 2006/0293024 A1 | 12/2006 | Benco et al. |
| 2007/0003024 A1 | 1/2007 | Olivier et al. |
| 2007/0201391 A1 | 8/2007 | Belmonte et al. |
| 2007/0273519 A1 | 11/2007 | Ichkawa et al. |
| 2007/0280428 A1 | 12/2007 | McClelland |
| 2007/0287473 A1 | 12/2007 | Dupray |
| 2008/0018452 A1 | 1/2008 | McCarthy et al. |
| 2008/0026728 A1* | 1/2008 | Snapp et al. ............ 455/414.1 |
| 2008/0057944 A1 | 3/2008 | Miriyala et al. |
| 2008/0064363 A1 | 3/2008 | Salafia et al. |
| 2008/0070546 A1 | 3/2008 | Lee |
| 2008/0144779 A1 | 6/2008 | Ray et al. |
| 2008/0200143 A1 | 8/2008 | Qui et al. |
| 2008/0261557 A1 | 10/2008 | Sim |
| 2008/0273670 A1 | 11/2008 | Dickinson |
| 2008/0304630 A1 | 12/2008 | Nguyen et al. |
| 2009/0047924 A1 | 2/2009 | Ray et al. |
| 2009/0086932 A1 | 4/2009 | Ray |
| 2009/0097474 A1 | 4/2009 | Ray et al. |
| 2009/0144260 A1 | 6/2009 | Bennett et al. |
| 2009/0186596 A1 | 7/2009 | Kaltsukis |
| 2009/0197567 A1 | 8/2009 | Ogram |
| 2009/0214011 A1 | 8/2009 | Geldbach et al. |
| 2009/0227225 A1 | 9/2009 | Mitchell et al. |
| 2009/0310602 A1 | 12/2009 | Olshansky et al. |
| 2010/0002845 A1 | 1/2010 | Zerillo et al. |
| 2010/0002846 A1 | 1/2010 | Ray et al. |
| 2010/0003946 A1 | 1/2010 | Ray et al. |
| 2010/0003947 A1 | 1/2010 | Ray et al. |
| 2010/0003949 A1 | 1/2010 | Ray et al. |
| 2010/0003954 A1 | 1/2010 | Ray et al. |
| 2010/0003955 A1 | 1/2010 | Ray et al. |
| 2010/0003961 A1 | 1/2010 | Ray et al. |
| 2010/0098062 A1 | 4/2010 | Croak et al. |
| 2010/0107192 A1 | 4/2010 | Sennett et al. |
| 2010/0142386 A1 | 6/2010 | Snapp et al. |
| 2010/0215153 A1 | 8/2010 | Ray et al. |
| 2010/0291894 A1 | 11/2010 | Pipes |
| 2011/0014923 A1 | 1/2011 | Krco et al. |
| 2011/0096769 A1 | 4/2011 | Sim |
| 2012/0309340 A1 | 12/2012 | Ray |
| 2013/0012156 A1 | 1/2013 | Ray et al. |
| 2013/0059560 A1 | 3/2013 | Ray et al. |
| 2013/0102269 A1 | 4/2013 | Ray et al. |
| 2013/0217355 A1 | 8/2013 | Ray et al. |
| 2013/0237181 A1 | 9/2013 | Ray |

OTHER PUBLICATIONS

U.S. Appl. No. 12/257,862; Non-Final Rejection dated Mar. 13, 2013; 30 pages.

U.S. Appl. No. 12/391,503; Final Rejection dated May 24, 2012; 19 pages.

U.S. Appl. No. 12/391,503; Non Final Office Action dated Feb. 16, 2012; 9 pages.

U.S. Appl. No. 12/257,574; Issue Notification dated Jan. 9, 2013; 1 page.

U.S. Appl. No. 13/150,725; Non-Final Rejection dated Nov. 26, 2012; 19 pages.

U.S. Appl. No. 13/614,585; Notice of Allowance dated Dec. 11, 2012; 30 pages.

Dale N. Hatfield, "A Report on Technical and Operational issues Impacting the Provision of Wireless Enhanced 911 Services," Federal Communications Commission, printed from the World Wide Web on May 8, 2006 (54 pages).

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID," Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK# 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT&T Wireless Unleashes the First and Only Wireless Messaging Device," PhysOrg.com, Sep. 30, 2004; available online at URL: <http://www.physorg.com/news1392.html> (12 pages).

(56) References Cited

OTHER PUBLICATIONS

"NENA Recommended Generic Standards for E9-1-1 PSAP Equipment" NENA Technical Reference, NENA-04-001 Issue 2, Mar. 2001, 105 pages.
U.S. Appl. No. 11/430,232; Non-Final Rejection dated Jan. 19, 2011; 20 pages.
U.S. Appl. No. 11/430,232; Notice of Allowance dated May 13, 2011; 12 pages.
U.S. Appl. No. 11/430,232; Issue Notification dated Aug. 17, 2011; 1 page.
U.S. Appl. No. 11/640,714; Non-Final Rejection dated Mar. 17, 2011; 15 pages.
U.S. Appl. No. 11/640,714; Non-Final Rejection dated Sep. 15, 2011; 15 pages.
U.S. Appl. No. 11/640,714; Final Rejection dated Feb. 29, 2012; 17 pages.
U.S. Appl. No. 11/640,714; Final Office Action dated Feb. 29, 2012; 17 pages.
U.S. Appl. No. 11/891,784; Notice of Allowance dated Jul. 18, 2012; 27 pages.
U.S. Appl. No. 11/891,784; Final Rejection dated Jan. 3, 2011; 18 pages.
U.S. Appl. No. 11/891,784; Non-Final Rejection dated Aug. 3, 2010; 13 pages.
U.S. Appl. No. 11/904,883; Non-Final Rejection dated Oct. 7, 2011; 19 pages.
U.S. Appl. No. 11/904,883; Final Rejection dated Apr. 27, 2012; 16 pages.
U.S. Appl. No. 11/974,775; Notice of Allowance dated Jun. 12, 2012; 15 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/168,668; Non-Final Rejection dated Feb. 6, 2012; 21 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Final Rejection dated Dec. 29, 2011; 18 pages.
U.S. Appl. No. 12/257,574; Non-Final Rejection dated Jul. 6, 2011; 20 pages.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Notice of Allowance dated Aug. 2, 2012; 17 pages.
U.S. Appl. No. 12/257,641; Notice of Allowance dated Feb. 2, 2012; 12 pages.
U.S. Appl. No. 12/257,641; Non-Final Rejection dated May 24, 2011; 17 pages.
U.S. Appl. No. 12/257,928; Non-Final Rejection dated Jun. 8, 2011; 21 pages.
U.S. Appl. No. 12/257,424; Final Rejection dated Jun. 13, 2012; 41 pages.
U.S. Appl. No. 12/257,424; Non Final Office Action dated Jan. 31, 2012; 21 pages.
U.S. Appl. No. 12/257,424; Non-Final Rejection dated Mar. 4, 2011; 20 pages.
U.S. Appl. No. 12/257,424; Final Rejection dated Jul. 14, 2011; 19 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 12/272,238; Notice of Allowance dated Jun. 8, 2012; 21 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 12/272,238; Non-Final Rejection dated Mar. 28, 2011; 14 pages.
U.S. Appl. No. 12/257,655; Non-Final Rejection dated Apr. 1, 2011; 34 pages.
U.S. Appl. No. 12/257,416; Non-Final Rejection dated Mar. 3, 2011; 22 pages.
U.S. Appl. No. 12/257,640; Non-Final Rejection dated Mar. 3, 2011; 21 pages.
U.S. Appl. No. 11/974,775; Corrected Notice of Allowability dated Aug. 31, 2012; 7 pages.
U.S, Appl. No. 12/257,574; Notice of Allowance dated Sep. 14, 2012; 25 pages.
U.S. Appl. No. 11/891,784; issue Notification dated Sep. 26, 2012; 1 page.
U.S. Appl. No. 11/974.775; Issue Notification dated Sep. 26, 2012; 1 page.
U.S. Appl. No. 12/272,238; Issue Notification dated Oct. 3, 2012; 1 page.
U.S. Appl. No. 11/904.883; Non Final Rejection dated Oct. 11, 2012; 26 pages.
U.S. Appl. No. 12/257,641; Issue Notification dated Nov. 7, 2012; 1 page.
U.S. Appl. No. 11/904,883; Non Final Rejection dated Apr. 19, 2013; 22 pages.
U.S. Appl. No. 13/614,585; Issue Notification dated May 1, 2013; 1 page.
U.S. Appl. No. 13/715,808; Non-Final Rejection dated Apr. 9, 2013; 36 pages.
U.S. Appl. No. 12/257,424; Non-Final Rejection dated Jul. 8, 2013; 46 pages.
U.S. Appl. No. 13/847,388; Non-Final Office Action dated Jul. 17, 2013; 54 pages.
U.S. Appl. No. 12/257,862; Non-Final Rejection dated Aug. 23, 2013; 29 pages.
U.S. Appl. No. 13/715,808; Notice of Allowance dated Sep. 13, 2013; 27 pages.
U.S. Appl. No. 12/257,424; Final Rejection dated Nov. 21, 2013; 34 pages.
U.S. Appl. No. 12/257,624; Non-Final Rejection dated Oct. 16, 2013; 38 pages.
U.S. Appl. No. 12/257,862; Notice of Allowance dated Dec. 6, 2013; 21 pages.
U.S. Appl. No. 12/257,928; Non-Final Rejection dated Nov. 20, 2013; 35 pages.
U.S. Appl. No. 12/391,503; Non Final Office Action dated Oct. 25, 2013; 23 pages.
U.S. Appl. No. 13/715,808; Issue Notification dated Dec. 24, 2013; 1 page.
U.S. Appl. No. 13/847,388; Non-Final Office Action dated Dec. 9, 2013; 34 pages.
U.S. Appl. No. 11/904,883; Non Final Rejection dated Feb. 5, 2014; 19 pages.
U.S. Appl. No. 12/257,928; Notice of Allowance dated Mar. 6, 2014; 20 pages.

* cited by examiner

EMERGENCY DATA MESSAGE ROUTER DATABASE

CROSS REFERENCE TO RELATED APPLICATIONS

This application is a continuation of U.S. application Ser. No. 12/257,641 (the "641 Application"), filed Oct. 24, 2008 by Amar Nath Ray et al. and entitled, "Emergency Data Message Router Database," which is hereby incorporated by reference in its entirety. The '641 Application claims priority to Provisional Patent Application Ser. No. 61/078,123 filed on Jul. 3, 2008 by Amar Nath Ray et al. and entitled, "Emergency 911 Text Messaging Services," the entire teachings of which are incorporated herein by reference.

BACKGROUND OF THE INVENTION

Emergency 911 services have traditionally been performed by a user placing a telephone call to "911." Prior to mobile communications developing, users would dial "911" on landlines, and the public switched telephone network (PSTN) would route the call to a public safety answering point (PSAP) local to a street address of the landline telephone used to place the call.

With mobile and wireless telephones, the address of a user in an emergency call is unknown. To determine the address or location of the caller, various techniques for determining geographic positioning of the caller are performed, including using global positioning system (GPS) equipment and network assisted positioning by using triangulation, as performed by a communications network. The communications network identifies the emergency "911" call and, based on the location of the caller, routes the call to a local PSAP with respect to the location of the caller. Depending on the technology used by the PSAP, geographic coordinates may be sent to the PSAP. If the PSAP is configured with enhanced "911" or E-911 Phase II, then a local automatic location identification (ALI) database may be used to convert the geographic coordinates to address-based coordinates.

As mobile telecommunications have advanced, different forms of data messaging communications have been developed, including text messaging, instant messaging, photo messaging, and video messaging. To accommodate these new forms of communications, a few PSAPs have advertised specific telephone numbers that users can send a text message, for example, to notify emergency services of an emergency. The problem is that unless a user has saved the emergency telephone number in his or her mobile device, the user is unlikely to remember the telephone number or not have time to enter the telephone number during an emergency situation. Furthermore, if the user has traveled any sufficient distance from a PSAP that has a specific telephone for sending text messages, then the PSAP is no longer local to the user.

SUMMARY

To overcome the problem of users not being able to send emergency data messages, such as text messages, to a common, easy to remember address that will be routed to a PSAP local to a user, the principles of the present invention provide for a system determine a PSAP local to the user and route the emergency data message to the PSAP. The system may be a centralized or distributed system associated with a network address.

One database configured to store information associated with public safety answering points may include a set of records including information associated with a plurality of PSAPs. Each record may include (i) an identifier indicative of a PSAP available to service emergency communications, (ii) at least one cell code identifier indicative of cell sites in which the associated PSAP services, and (iii) at least one network address capable of receiving certain emergency data message types.

One method for providing information associated with public safety answering points may include storing a set of records including information associated with a plurality of PSAPs, each record may include (i) an identifier indicative of a PSAP available to service emergency communications, (ii) at least one cell code identifier indicative of cell sites in which the associated PSAP services, and (iii) at least one network address capable of receiving certain emergency data message types. In response to receiving a request, a PSAP local to a wireless communications device of a user who sent an emergency data message may be identified, and a network address associated with the identified local PSAP may be provided.

One embodiment of a system for providing information associated with PSAPs may include a database including a set of records including information associated with a plurality of PSAPs. Each record may include an identifier indicative of a PSAP available to service emergency communications, at least one cell code identifier indicative of cell sites in which the associated PSAP services, and at least one network address capable of receiving certain emergency data message types. The system may further include a processing unit configured to identify, in response to receiving a request, a PSAP local to a wireless communications device of a user who sent an emergency data message, and provide a network address associated with the identified local PSAP.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
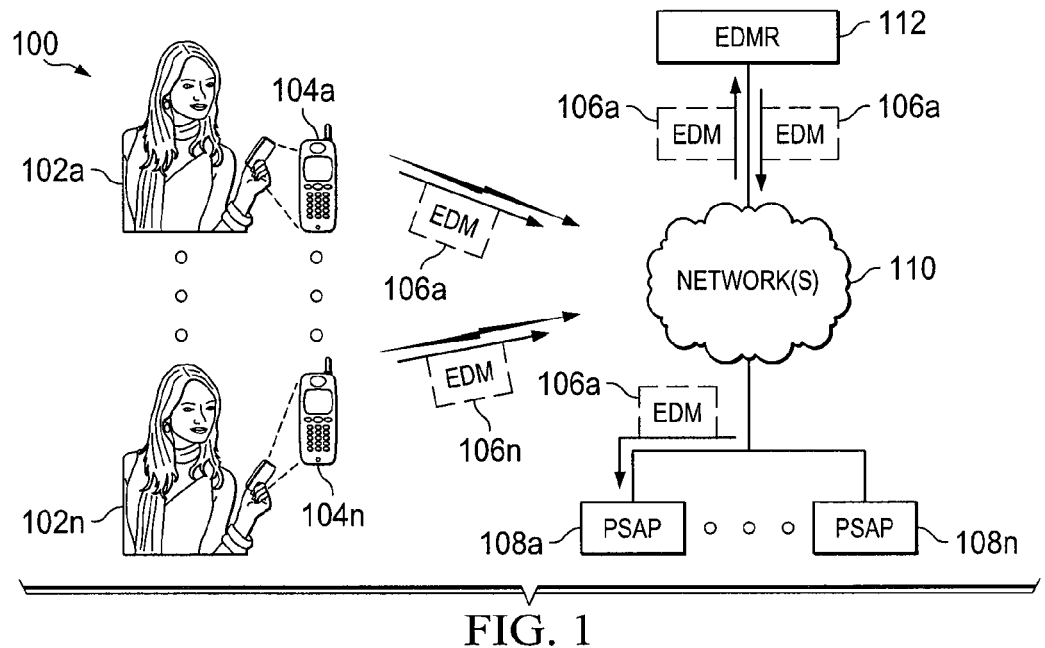
FIG. 1 is an illustration of illustrative network environment in which users of wireless communications devices are able to send emergency data messages via an emergency data message router to local public safety answering points.

With regard to FIG. 1, a network environment 100 provides users 102a-102n (collectively 102) of wireless communications devices 104a-104n (collectively 104), which may be mobile telephones, personal digital assistants (PDAs), wireless electronic games, multi-mode telephones, or other electronic devices capable of communicating emergency data messages (EDMs) 106a-106n (collectively 106) to public safety answering points (PSAPs) 108a-108n (collectively 108). As understood in the art, multiple wireless network operators may be concurrently providing wireless services using various operating frequencies and network protocols. Emergency data messages may include text messages, instant messages (IMs), emails, photo messages, video messages, and the like. The emergency data messages 106 may be communicated to an emergency network address, such as Internet Protocol (IP) domain routing address "emergency.org," "911.911," or any other network address, by users 102 from the wireless communications devices 104. In one embodiment, the emergency data messages 106 may be generated and communicated by activating a single emergency data message button, either a hard-button or a soft-button, that causes the wireless communications devices 104 to generate a pre-established data message.

A pre-established data message, such as a text message, may include information associated with a respective user, such as a network identification number (NID), mobile electronic device identification number (MEID), which is commonly called a cell code identifier, user's name, telephone number, home or work address, secondary contact number, or any other information associated with a user such that an operator at a PSAP or emergency personnel (e.g., police) may have information of the user if he or she is unable to be immediately located. In addition, the emergency data messages 106 may be appended with a checksum, such that the message can be validated to be received without error. It should be understood that various checksum algorithms may be employed and may or may not include capabilities to detect and correct errors. Alternatively, a "free-form" data message, such as a text message, may be sent to an emergency network address, but the user may run the risk of being incomplete or too "cryptic" due to being in an emergency situation or using abbreviations unfamiliar to PSAP operators. The emergency data message may be communicated via the network(s) 110 to a PSAP local to the respective user.

The networks 110 may include mobile networks, wireless communications networks, Internet, public switched telephone network (PSTN), or any other network capable of communicating an emergency data message to the PSAPs 108. As shown, an emergency data message 106a is communicated from the wireless communications device 104a via the network(s) 110 to an emergency data message router (EDMR) 112, which may be located at an emergency message address that is configured to determine a PSAP 108a that services a geographic area in which the user 102a is currently located.

The emergency data message router 112 may be a centralized router associated with an address to which the emergency data messages 106 are communicated or may be configured as distributed routers that handle incoming emergency data messages from respective regions of the country or world. The emergency data message router 112 may receive data communicated with an emergency data message that may be used to identify a geographic location, geographic area, cell site, or otherwise, as further described herein. In addition, the emergency data message router 112 may determine which of the PSAPs local to a user sending an emergency data message has communications capabilities for handling the type of emergency data message (e.g., text message) being sent. In one embodiment, the EDMR 112 may recognize that a PSAP can only accept certain types of message formats based, and may perform a lossless message format translation from one format to another based upon this recognition.

Figure 2:
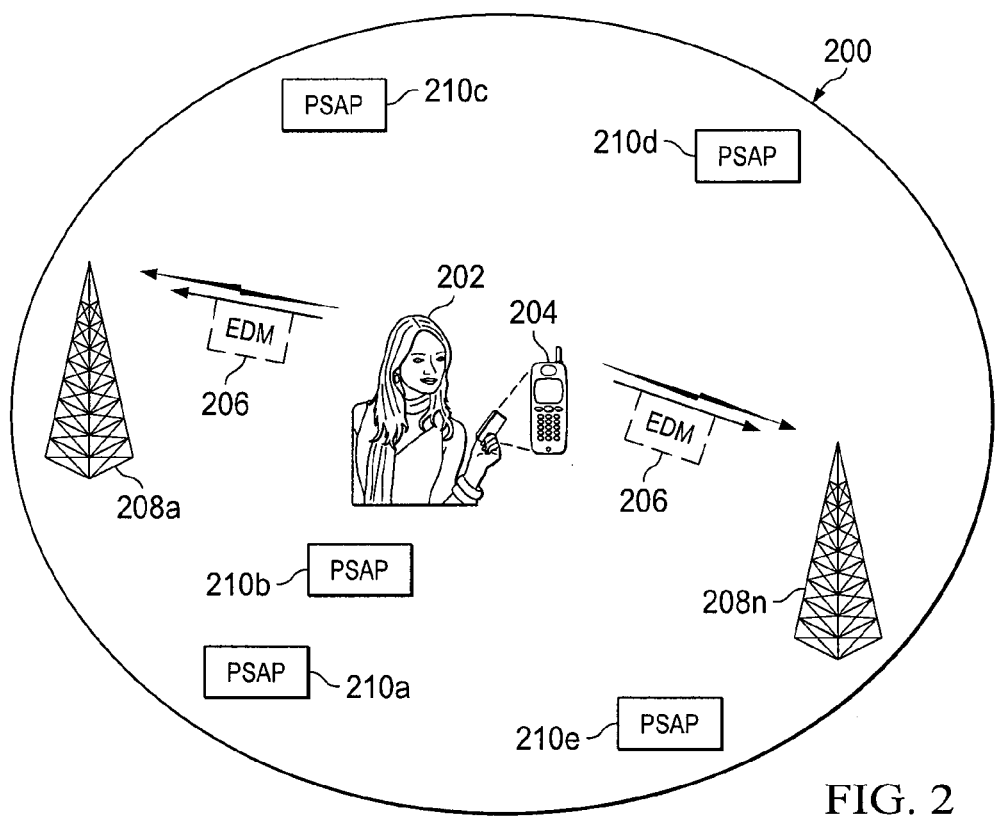
FIG. 2 is an illustration of a user of a wireless communications device operating in a cell site in which multiple PSAPs have different communications capabilities.

With regard to FIG. 2, a cell site 200 operates to handle wireless communications calls and messages communicated from users within the cell site 200. As shown, a user 202 using a wireless communications device 204 communicates an emergency data message 206 to any cell tower 208a-208n (collectively 208) or other wireless access points within the range of the wireless communications device 204.

Each of the PSAPs 210 may have different communications capabilities. For example, while all the PSAPs have voice capabilities, some PSAPs may be more limited. Not all PSAPs will have text messaging capabilities, image viewing capabilities (e.g., photographs and videos), e-mail capabilities, and so forth. Depending on the type of emergency data message sent by the user 202 using the wireless communications device 204, which may have a wide variety of messaging capabilities, the emergency data messages 206 may be communicated to a PSAP that is local to the user (e.g., within the cell site 200) and has communications capabilities that are compatible with the emergency data messages (e.g., includes the ability to receive text messages through a mobile or other communications system, as understood in the art).

Figure 3:
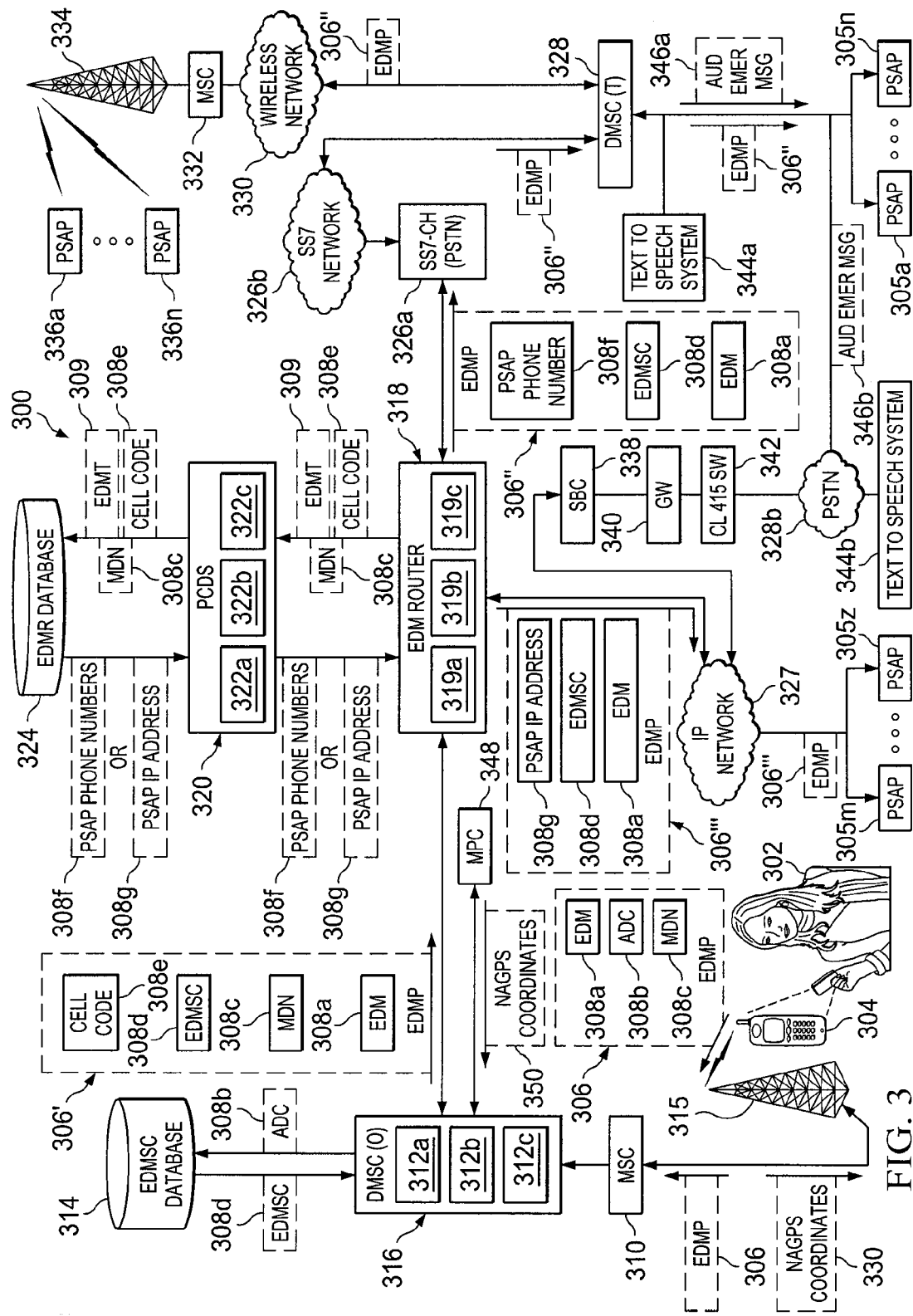
FIG. 3 is a block diagram of an illustrative communications network environment configured to receive and process emergency data messages to PSAPs local to users who sent the emergency data messages.

With regard to FIG. 3, a network environment 300 is configured to enable a user 302 using a wireless communications device 304 to communicate emergency data messages to public safety answering points 305a-305n and/or 305m-305z (collectively 305). The PSAPs 305a-305n are representative of PSAPs that are capable of receiving text messages and telephone calls, and the PSAPs 305m-305z are PSAPs that are capable of receiving emergency data messages in the form of e-mail messages or other data format that is generally communicated over IP networks, as well as telephone calls. It should be understood that the PSAPs 305a-305n and 305m-305z may overlap by one or more PSAP having multiple types of communications capabilities. It should be understood that the communications capabilities of the PSAPs 305 may vary over time as technology advances.

The user 302 may send an emergency data message package 306 by making an emergency data message request on the wireless communications device 304. In making the emergency data message request, the user may select a single button, multiple buttons, or use a menu system to cause the wireless communications device 304 to generate and communicate an emergency data message (EDM) 308a. In one embodiment, an emergency data message 308a may be a pre-established text message that includes NID, MEID, contact information of the user, such as telephone number, home address, name, and other contact information, and insert geographic coordinates, such as GPS coordinates, that identify a location at which the user 302 is located at the time the user makes the emergency data message request. Alternatively, the emergency data message 308a may be a conventional data message (e.g., text message, instant message, or email) that a user initiates without a template or pre-established data being initially generated. The emergency data message package (EDMP) 306 may include the emergency data message 308a that may include up to 160 characters, in the case of an SMS message, abbreviated dialing code 308b, and mobile directory number (MDN) 308c.

The abbreviated dialing code 308b may be an alphanumeric code that is stored in the wireless communications device 304 and communicated with the emergency data message 308a to a mobile switching center (MSC) 310. The abbreviated dialing code 308b may be established by a service provider and/or manufacturer of the wireless communications device 304. The abbreviated dialing code 308b may essentially be any code, typically a ten digit code, that indicates that an emergency data message is being communicated from the wireless communications device 304. As an analogy, on the voice network there are many different types of abbreviated dialing codes, including "411" for placing an information call to a service provider, "911" for placing an emergency telephone call, and so on. As an example, an abbreviated dialing code for indicating that an emergency data message is being communicated may be "0000000SOS." Alternatively, if different types of emergency data messages are available for selection using a menu system on the wireless communications device 304, then different abbreviated dialing codes may also be selectively communicated to represent the selected emergency data message that is being sent. For example, the abbreviated dialing codes may include "000000SOS1," "000000SOS2," "000000SOS3," and so on to indicate different types of emergencies and certain content in the emergency data messages. The different types of emergencies may include medical condition, automobile accident, fire, assault, or any other type of emergency data message that may be helpful to an operator at a PSAP for dispatching emergency personnel.

For SMS messages, when the mobile switching center 310 receives the emergency data message 306, the mobile switching center 310 routes the emergency data message 306 to an originator data message service controller (DMSC(O)) 316. The DMSC(O) 316 utilizes a process executed by a processing unit 312a that determines whether the emergency data message 308a is, in fact, an emergency data message being communicated to a PSAP or a standard data message, such as a text message being communicated between peers. In addition, the MSC 310, DMSC(O) 316, or other network node may perform additional functions, such as initiate continuous geographic coordinate or geo-coordinate updates to the PSAP, if the emergency data message 306 is determined to be inclusive of certain content, such as hostage situation, by inspecting the abbreviated dialing code or other data.

The DMSC(O) 316 may also include a memory 312b, which may include random access memory, disk drive memory, or other memory as understood in the art, that stores data and software and input/output unit 312c that communicates data over a network and with other local devices. In one embodiment, the memory 312b may store abbreviated dialing codes so as to be used by the processing unit 312a in determining whether the emergency data message 308a is, in fact, a priority message. In doing so, the processing unit 312a processes or parses the emergency data message package 306 to determine whether an abbreviated dialing code 308b is included or otherwise communicated with the emergency data message 308a. If it is determined that the emergency data message is a priority message, then the processing unit 312a may communicate the abbreviated dialing code 308b to an emergency data message short code database (EDMSC DB) 314, which may be local or remote from the DMSC(O) 316.

The emergency data message short code database 314 may include a listing (see TABLE I) of abbreviated dialing codes and short codes associated therewith so as to return an emergency data message short code 308d to the DMSC(O) 316 that is indicative of the type of emergency data message 308a. The emergency data message short code 308d may be alphanumeric data and utilized by other nodes in the network environment 300 for prioritizing processing of the emergency data message package 306', which includes the emergency data message 308a (e.g., text), mobile directory number 308c, emergency data message short code 308d, and cell code 308e. The cell code or cell code identifier 308e is a data value associated with a cell of a mobile communications system and is typically determined by the mobile switching center 310 by determining to which cell tower the wireless communications device 304 is communicating.

The DMSC(O) 316 processes the emergency data message 306' for routing to emergency data message router 318. This processing may include message decoding of the abbreviated dialing code 308b and initiating additional action, such as notifying alternative wireless carriers to provide continuous geo-coordinate updates to the PSAP, if possible. In addition, the DMSC(O) 316 may perform message format translation from one format to another format. In another embodiment, for SMS messages, the function described above could be performed at the MSC 310 or SMSC (not shown), which would avoid modification to the MSC 310 or inclusion of the DMSC(O) 316.

TABLE I

| ADC | EDM Short Code | TYPE |
| --- | --- | --- |
| SOS0 | EMERGENCY0 | Default |
| SOS1 | EMERGENCY1 | Medical |
| SOS2 | EMERGENCY2 | Automobile Accident |
| SOS3 | EMERGENCY3 | Fire |
| SOS4 | EMERGENCY4 | Assault |

In the case of Instant Messaging, when the mobile device initiates an emergency IM, the IM is rerouted to the DMSC(O) 316 instead of the user's normal IM service provider's servers. The DMSC(O) 316 perform functions previously defined to determine the proper PSAP. For email, the addressee domain name is the emergency indicator. In one embodiment, the user's email provider routes the message to the appropriate DMSC(O) based on that addressee's Internet Protocol Domain Name Service (DNS) resolution. This DMSC(O) 316 may be a clearinghouse type of DMSC(O). In another embodiment, software on the device intercepts the email and reroutes it to the carrier's DMSC(O) for processing. If the DMSC(O) 316 determines it is not an emergency, it forwards to the appropriate email provider's system.

The emergency data message router 318 may execute a process on processing unit 319a that processes the emergency data message package 306' to communicate the cell code 308e to a PSAP capabilities defining system (PCDS) 320. In an alternative embodiment, the emergency data message router 318 and PCDS 320 are configured on a single computing system. The processing unit 319a may include one or more processors. Other computing and communications components, such as a memory 319b for storing data and software, input/output (I/O) unit 319c for communicating data over a network, may be included in the emergency data message router 318, as understood in the art. The PCDS 320 may execute a process on a processing unit 322a for determining PSAPs local to the user 302 and communications capabilities of PSAPs that are determined to be local to the user 302. The PCDS 320 may also include a memory 322b for storing memory and software and input/output unit 322c for communicating data over a network and/or with the EDM router 318. Determination may be made on information provided as part of the message including geo-coordinates of the sending device and geo-coordinates of the PSAPs using an algorithm to determine the nearest emergency service provider as per the emergency type.

In determining local PSAPs, the PCDS 320 may receive the mobile directory number 308c and cell code 308e and use a three-digit exchange code portion of the MDN 308c and/or cell code 308e to determine whether there is a PSAP local to the exchange code of the wireless communications device 304 by matching the three-digit exchange code of the MDN 308c and exchange code associated with the PSAPs. However, because the wireless communications device 304 is mobile and may be utilized outside the exchange area in which the wireless communications device 304 is initially registered, a PCDS 320 may or may not use the MDN 308c in determining a local PSAP to the user 302. For example, if the exchange code digits of the MDN 308c are foreign to an area in which the wireless communications device 304 is operating, then the PCDS 320 may be limited to using the cell code 308e to determine PSAPs that are local to the user 302. A combination of both the cell code 308e and exchange code may be used to determine local PSAPs. Alternatively, a determination may be made on information provided as part of the message including geo-coordinates of the sending device and geo-coordinates of the PSAPs using a mathematical vector algorithm or equivalent database query to determine the nearest emergency service provider as per the emergency type.

An emergency data message router database 324 may be in communication with the PCDS 320 to enable the PCDS 320 to look up PSAPs that are (i) local to the user 302 and (ii) have particular communications capabilities. The emergency data message router database 324 may be local to or remotely located from the PCDS 320. The communications capabilities may include the ability to receive text messages, instant messages, e-mails, photo messages, or video messages, as understood in the art. In determining the communications capabilities, the PCDS 320 and/or EDMR DB 324 may determine an address associated with a local PSAP, and the communications capabilities may be identified by the type of address (e.g., telephone number or IP address) or position of the address within the EDMR DB 324.

With each of these communications capabilities, the PSAPs have access to communications network(s) that are capable of communicating compatible emergency data messages of those types. It should be understood that the PCDS 320 and process being executed by the processing unit 322a may identify the type of emergency data message 308a that is being communicated and determine which PSAP local to the user 302 is capable of receiving that type of emergency data message. For example, if the emergency data message 308a is a text message, then a PSAP that is both local to the user and has capabilities of receiving emergency text messages may be determined to be most compatible with the emergency data message that is being communicated to request emergency assistance.

Although a PSAP that is closest to the user 302 may be considered ideal from an emergency personnel deployment perspective, because emergency data messages are being communicated by the user 302, and many PSAPs are not equipped to handle certain types of communications, the PCDS 320 may determine whether any PSAPs local to the user 302 are compatible with the emergency data message 306' that is being communicated before selecting the PSAP to route the emergency data message 308a. In other words, an emergency data message sent in its original form may be best to provide to a PSAP in that same form to avoid loss of data, corruption of the data, or misinterpretation by a PSAP operator. Any translations that may be performed to convert from one format to another are lossless; meaning no loss of any information.

To determine whether a PSAP has compatible communications, the emergency data message router 318 may determine, by examining a packet header or other data field(s), generate, and communicate an emergency data message type (EDMT) 309, which may be an alphanumeric value and is indicative of the type of emergency data being communicated (e.g., text, image, instant message, email). The PCDS 320 may use and/or communicate the EDMT 309 to the emergency data message router database 324 to identify any PSAPs local to the user that have communications capabilities that are compatible with the emergency data message type. If, for example, it is determined by the PCDS 320 that there are no PSAPs local to the user 302 that are compatible with receiving text messages based on the EDMT 309, then the PCDS 320 may determine that an emergency text message may be communicated to a local PSAP by sending the PSAP to a text-to-speech translator for converting the text-to-speech for audible communication to the local PSAP. The emergency data message router database 324, in response to locating a local PSAP with the most compatible communications capabilities, may return a PSAP telephone number 308f or PSAP IP address 308g, depending on the communications network that is available to communicate the type of emergency data message received from the wireless communications device 304. The PSAP telephone number 308f may be used for a text message or image message to be communicated to the PSAP and the PSAP IP address 308g may be used for communicating an email to the PSAP, for example. Other types of message translations may be employed as available.

Depending on whether the selected PSAP is to be communicated via an SS7 clearinghouse (CH) 326a and SS7 network 326b, IP network 327, wireless communications network 330 (e.g., mobile network), or any other communications system or network, the emergency data message router 318 may communicate the emergency data message 308a to the telephone number or address of the selected PSAP. If the emergency data message 306" is to be communicated over the SS7-CH 326a and network 326b, then the PSAP telephone number 308f is communicated with the emergency data message short code 308d and emergency data message 308a to the PSAP 305n that is determined to be local to the user 302 and capable of receiving the emergency data message 308a having the appropriate communications network connection and software interface for displaying the emergency data message 308a.

The emergency data message package 306" is communicated via a terminating data message service controller (DMSC(T)) 328 for routing to the appropriate PSAP via the PSTN 329a or wireless communications network 330. If the emergency data message 308a is a text message or image, then the DMSC(T) 328 may route the EDMP 306" via the wireless communications network 330, including a mobile switching center 332 and base station 334, to one of the PSAPs 336a-336n (collectively 336). The PSAPs 336 may be limited to wireless or mobile communications or have multiple communications capabilities. It should be understood that although the PSAPs 305a-305n, 305m-305z, and 336a-336n are shown to be in communication with different communications networks, that each may be in communication with one or more of the communications network and have separate devices that communicate with respective communications networks or have a device that is capable of receiving and/or consolidating emergency messages from different communications networks.

If alternatively, the emergency data message 308a is an email rather than a text or photo message, then the PCDS 320 determines a PSAP local to the user 302 that is configured to receive emails and routes the emergency data message package 306' via the IP network 327 to a PSAP 305m that is local to the user 302 and configured to receive and display emails. In determining the appropriate PSAP, the PCDS 320 accesses the emergency data message router database 324 to look-up a local PSAP with email communications capabilities and receives the PSAP IP address 308g from the emergency data message router database 324 for communicating the emergency data message package 306′′′ to the PSAP IP address 308g at the PSAP, in this case PSAP 308m.

A communication link between the IP network 327 and PSTN 329b may be formed by including a session border controller 338, gateway 340, and class 4/5 telephony switch 342, or parts thereof, as understood in the art, so that emergency data messages may be routed via the IP network 327 for distribution to a PSAP that is limited to communicating via the PSTN 329b, as may be found in rural areas of the country. Because different portions of the PSTN 329b may be configured to handle IP messaging from the IP network 327, the PSTN 329b is shown separately from the PSTN 329a. Because the emergency data message 308a includes text, if the emergency data message 308a is communicated over the PSTN 329a or the IP network 327 and PSTN 329b, the text is converted by a text-to-speech system 344a or 344b, respectively, to generate an audible emergency message 346a or 346b, respectively. The decision and ability to route the emergency data message 308a via the SS7 network 326b or IP network 327 may be dependent upon the configuration of the EDM router 318. However, because the emergency data message 308a is to be expedited to a PSAP, other factors, such as network congestion, selected PSAP communications capabilities, or other factors, may be used by the EDM router 318 to select which network path to communicate the emergency data message 308a. In addition, the EDM router 318 may raise the priority level on the IP packet if quality of service capabilities are available in the network.

More specifically, the emergency data message router database 324 may include a database or table that stores and manages, and/or also performs algorithm calculations to arrive at, PSAP cell codes, capabilities, and network addresses so that the PCDS 320 may select an appropriate PSAP to communicate the emergency data message based on a number of factors. The factors may include distance from the user, type of emergency data message, network connection, which may be indicated by whether a network address is available, geographic coordinates, and so forth. An illustrative listing of a table that may be managed and operated by the emergency data message router database 324 is shown in TABLE II below.

The EDM router 318, PCDS 320, EDMR DB 324 or combination thereof may route or reformat, re-address, and/or route the emergency data message 308a. If a determination is made that a PSAP does not have a compatible communications capability as an emergency data message, then the emergency content of the emergency data message may be reformatted, re-addressed, and re-routed. If the emergency data message type matches the communications capabilities of a selected local PSAP, then the emergency data message 308a may be routed accordingly.

As an example, if the emergency data message type of the emergency data message 308a is a text message being communicated using SMS and the communications capabilities of a local PSAP includes text messaging, then the emergency data message package 306′′ is routed to the SS7-CH 326a for delivery to a wireless device at one of the PSAPs 305a-305n. If the communications capabilities of a local PSAP includes instant messaging without text messaging, then the emergency data message 308a is reformatted and re-addressed to comply with instant message protocols and sent to an instant message client at the PSAP via either the SS7-CH 326a and network 326b or IP network 327, depending on a network address (e.g., telephone number or IP address) of the PSAP. If the communications capabilities of a local PSAP includes email, then the emergency data message 308a may be reformatted and re-addressed to comply with email protocols and sent to a PSAP email client with a priority indication, either the emergency data message short code 308d or otherwise. If the communications capabilities of a local PSAP is limited to voice only, then the emergency data message 308a is communicated to the text-to-speech system 344, as understood in the art, via the DMSC(T) 328 for synthesizing speech of content of the emergency data message 308a and communication to the local PSAP. Alternatively, if the message format is not reformattable, nor is easily translated to speech, then the message may be routed to an alternative PSAP.

Figure 4:
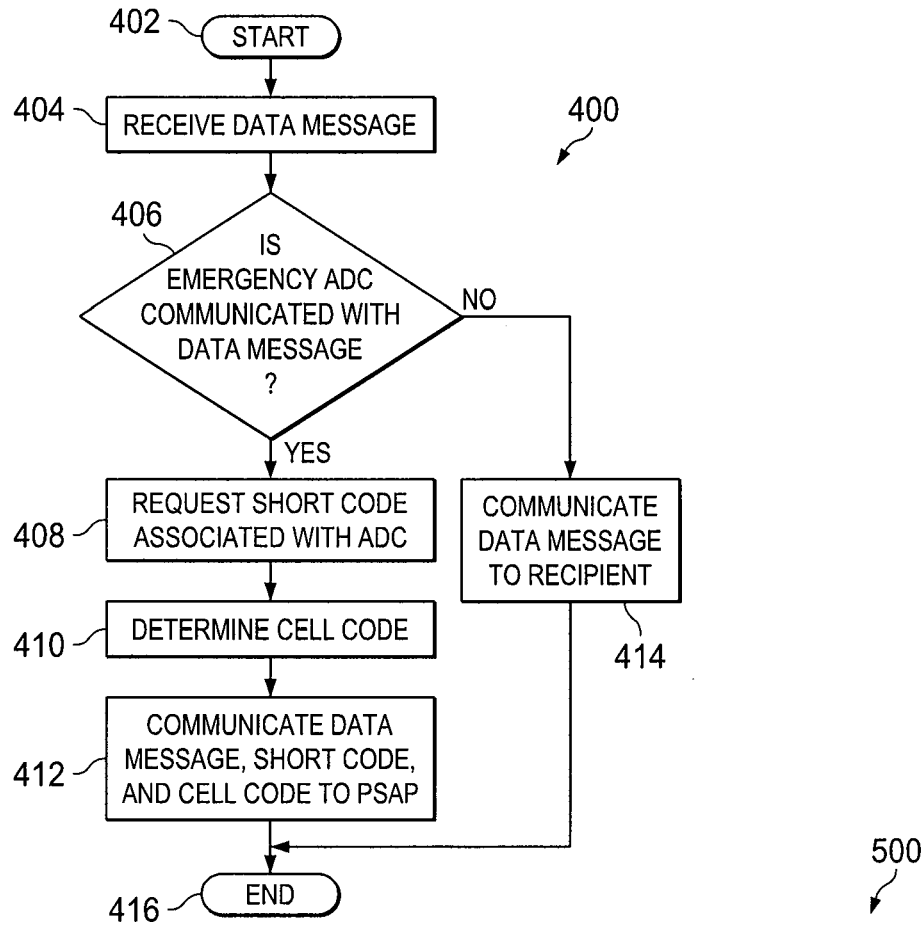
FIG. 4 is a flow diagram of an illustrative process for a mobile switching center to receive and process emergency data messages.

With regard to FIG. 4, an illustrative process 400 of a system identifying an emergency data message is provided. The process 400 starts at step 402. At step 404, a data message is received. The data message may be a text message, instant message, email, or any other data message that may be communicated from a wireless communications device. At step 406, a determination may be made as to whether an emergency abbreviated dialing code is communicated with the data message. If so, then at step 408, a short code associated with the emergency abbreviated dialing code may be requested. In addition, a determination of a cell code in which the wireless communications device that communicated the emergency data message may be determined. The emergency data message, short code, and cell code may be communicated to a PSAP at step 412. In communicating to the PSAP, the information, including the emergency data message, short code, and cell code, is communicated via a communications network to a network address for determining a PSAP local to a user who sent the emergency data message. If, at step 406, an emergency abbreviated dialing code is not communicated

TABLE II

| PSAP | PSAP Cell Code | Exchange Codes | Capabilities | Network Addresses | | |
|---|---|---|---|---|---|---|
| | | | | Voice (PSTN) | Text/Image (Mobile Network) | Email (IP Address) |
| Easton | 3719 | 405 | Voice | 972-405-1234 | — | — |
| Weston | 3720 | 826, 259 | Voice, Text | 972-826-1234 | 972-259-9876 | — |
| Central 1 | 3721, 3729 | 408 | Voice | 214-408-9876 | — | — |
| Central 2 | 3721, 3730 | 528, 526 | Voice, Text | 214-528-1234 | 214-526-5555 | — |
| Central 3 | 3721, 3729 | 528, 259 | Voice, Text, Image, Email | 214-528-5678 | 214-259-5555 | 127.37.17.38 |
| South 1 | 3722, 3741 | 699 | Voice | 817-699-1234 | — | — |
| South 2 | 3722, 3733 | 347, 283 | Voice, Text | 817-347-1234 | 817-283-5555 | — |
| North | 3723 | 277, 623 | Voice, Text, Image, Email | 972-277-1234 | 972-623-5555 | 128.94.1.23 | with the data message, then at step 414, the data message is communicated to a recipient, as understood in the art. The process ends at step 416.

Figure 5:
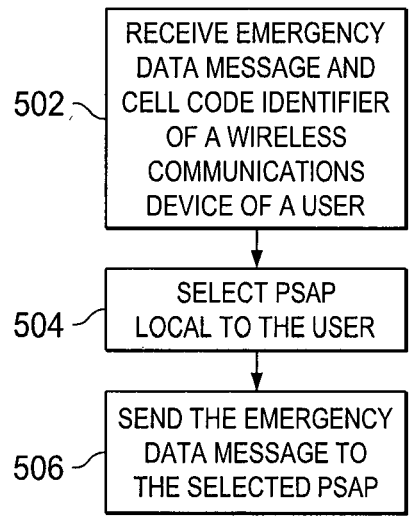
FIG. 5 is a flow diagram of an illustrative process for selecting a PSAP local to a user who sent an emergency data message.

With regard to FIG. 5, an illustrative process 500 may be performed by a PSAP capabilities defining system, which may be in communication with an emergency data message router. At step 502, an emergency data message, NID, and cell code identifier of a wireless communications device of a user may be received. In addition, a mobile directory number may also be received. At step 504, a PSAP local to the user may be selected. In selecting the local PSAP, a determination of the communications capabilities at one or more PSAPs local to the user may be determined using the cell code identifier and/or mobile directory number so as to determine which PSAP is nearest the user that has communications capabilities that are most compatible with the format of the emergency data message. At step 506, the emergency data message may be sent to the selected PSAP.

Figure 6:
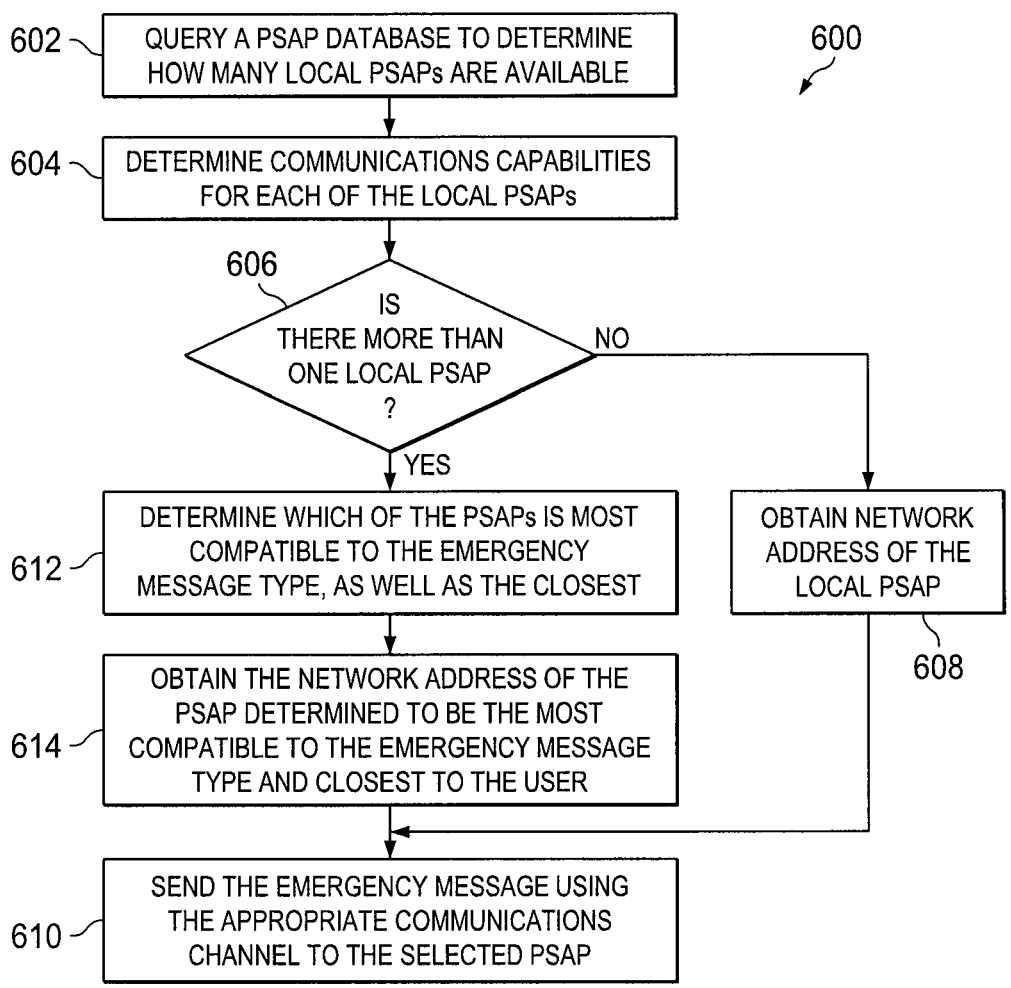
FIG. 6 is a flow diagram of a more detailed illustrative process for determining a PSAP local to a user who sent an emergency data message based on PSAP distance from the user and communications capabilities of the local PSAPs.

With regard to FIG. 6, a more detailed process 600 for determining to which PSAP to communicate an emergency data message is provided. At step 602, a query of a PSAP database may be made to determine how many local PSAPs are available with respect to a user who communicates an emergency data message. At step 604, a determination as to communications capabilities of each of the local PSAPs may be made. The determination may include determining the types of data messages that may be received by each of the PSAPs and communications networks to which the PSAPs are in communication. At step 606, a determination may be made as to whether there are more than one local PSAP. If not, then at step 608, a network address, such as a telephone number, IP address, or otherwise, of the local PSAP may be obtained. At step 610, the emergency data message may be sent to the PSAP using the appropriate communications channel. For example, in the event that the emergency data message is a text message, then if the network address of the local PSAP is a telephone number that is operating on a mobile communications system, then the emergency data message may be communicated over the mobile communications system to the PSAP.

If at step 606, a determination is made that more than one local PSAP is available, then at step 612, a determination as to which of the PSAPs the emergency data message type is most compatible and closest to the user who sent the emergency data message. At step 614, a network address of the PSAP determined to be the most compatible to the emergency data message type and closest to the user may be obtained. Although it may be desirable to identify the closest PSAP to the user and send the emergency data message to that PSAP, if the PSAP does not have communications capabilities to receive the emergency data message, then it may be as or more beneficial to find a PSAP that is further from the user and has the communications capabilities that accommodates the type of emergency data message that was sent so that an operator at the PSAP can handle the emergency request more efficiently. For example, if a PSAP is close to a user, but does not have text messaging capabilities and another PSAP which may be a few miles farther than the user but does have text messaging capabilities, then the emergency data message may be better communicated to the PSAP farther away even though the text message may be communicated to a text-to-speech system that may convert the information in the emergency text message for audible play to an operator at the closer PSAP. If no local PSAPs have text messaging capabilities, an emergency text message may be communicated to a text-to-speech converter so that the synthesized speech can be routed to a PSAP closest to the user. The process 600 continues at step 610, where the emergency data message is communicated to the selected PSAP.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A method for routing a call from a communications device to a public safety answering point (PSAP), the method comprising:
receiving the call at an emergency data message router;
determining a location of the communications device;
determining an emergency data message type associated with the call;
determining, using a processor, a plurality of public safety answering points (PSAPs) appropriate to receive the call;
selecting a closest, by location, public safety answering point from the plurality of public safety answering points appropriate to receive the emergency call, based on data message format capabilities of the public safety answering points, wherein the data message format capabilities include one or more of text message capability, instant message capability, email capability, photo message capability or video message capability;
recognizing that the selected closest public safety answering point can only accept certain types of data messages;
translating the call from a first data message format to a second data message format, the second data message format being a type of data message the selected closest public safety answering point can accept, wherein the first and second data message format is one of text message, instant message, email, photo message, or video message; and
routing the translated call to the selected public safety answering point.

2. The method of claim 1, wherein determining the plurality of public safety answering points appropriate to receive the call comprises accessing a database containing a set of records including information associated with the plurality of PSAPs, each record including:
- an identifier indicative of a PSAP available to service emergency communications;
- at least one cell code identifier indicative of cell sites; and
- at least one network address capable of receiving certain emergency data message types.

3. The method of claim 1, wherein receiving the call includes receiving a cell code identifier identifying a cell tower in communication with the communications device.

4. The method of claim 1, wherein receiving the call includes receiving an identifier indicative of the emergency data message type being a text message.

5. The method of claim 1, wherein determining the plurality of public safety answering points appropriate to receive the call includes identifying at least one PSAP having a matching exchange code with an exchange code of the mobile directory number of the communications device.

6. The method of claim 1, wherein selecting a closest public safety answering point from the plurality of public safety answering points appropriate to receive the call includes using at least one cell code identifier to identify a PSAP local to the communications device.

7. The method of claim 1, wherein the emergency data message type is an email.

8. The method of claim 1, wherein the emergency data message type is an instant message.

9. The method of claim 1, wherein the emergency data message type is an image file.

10. The method of claim 1, wherein the emergency data message type is a video file.

11. A system for routing a call from a communications device to a public safety answering point (PSAP), the system comprising:
- a network communication interface for receiving the call; and a processor configured to: determine a location of the communications device;
- determine an emergency data message type associated with the call;
- determine a plurality of public safety answering points (PSAPs) appropriate to receive the call;
- select a closest, by location, public safety answering point from the plurality of public safety answering points appropriate to receive the call, based on data message format capabilities of the public safety answering points, wherein the data message format capabilities include one or more of text message capability, instant message capability, email capability, photo message capability or video message capability;
- recognize that the selected closest public safety answering point can only accept certain types of data messages;
- translate the call from a first data message format to a second data message format, the second data message format being a type of data message the selected closest public safety answering point can accept, wherein the first and second data message format is one of text message, instant message, email, photo message, or video message; and
- route the call to the selected public safety answering point.

12. The system of claim 11, wherein determining the plurality of public safety answering points appropriate to receive the call comprises accessing a database containing a set of records including information associated with the plurality of PSAPs, each record including:
- an identifier indicative of a PSAP available to service emergency communications;
- at least one cell code identifier indicative of cell sites; and
- at least one network address capable of receiving certain emergency data message types.

13. The system of claim 11, wherein receiving the call includes receiving a cell code identifier identifying a cell tower in communication with the communications device.

14. The system of claim 11, wherein receiving the call includes receiving an identifier indicative of the emergency data message type being a text message.

15. The system of claim 11, wherein determining the plurality of public safety answering points appropriate to receive the call includes identifying at least one PSAP having a matching exchange code with an exchange code of the mobile directory number of the communications device.

16. The system of claim 11, wherein selecting a closest public safety answering point from the plurality of public safety answering points appropriate to receive the call includes using at least one cell code identifier to identify a PSAP local to the communications device.

17. The system of claim 11, wherein the emergency data message type is an email.

18. The system of claim 11, wherein the emergency data message type is an instant message.

19. The system of claim 11, wherein the emergency data message type is an image file or a video file.

20. A machine-readable tangible and non-transitory medium having information for routing a call from a communications device to a public safety answering point (PSAP), wherein the information, when read by the machine, causes the machine to perform the following:
- determine a location of the communications device;
- determine an emergency data message type associated with the call;
- determine a plurality of public safety answering points (PSAPs) appropriate to receive the call;
- select a closest, by location, public safety answering point from the plurality of public safety answering points appropriate to receive the call, based on data message format capabilities of the public safety answering points, wherein the data message format capabilities include one or more of text message capability, instant message capability, email capability, photo message capability or video message capability;
- recognize that the selected closest public safety answering point can only accept certain types of data messages;
- translate the call from a first data message format to a second data message format, the second data message format being a type of data message the selected closest public safety answering point can accept, wherein the first and second data message format is one of text message, instant message, email, photo message, or video message; and
- route the call to the selected public safety answering point.

* * * * *